(12) United States Patent
Lee

(10) Patent No.: US 12,469,894 B2
(45) Date of Patent: Nov. 11, 2025

(54) SECONDARY BATTERY AND BATTERY MODULE HAVING THE SAME

(71) Applicant: LG Energy Solution, Ltd., Seoul (KR)

(72) Inventor: Jae Chan Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/673,693

(22) Filed: May 24, 2024

(65) Prior Publication Data

US 2024/0313280 A1 Sep. 19, 2024

Related U.S. Application Data

(63) Continuation of application No. 17/601,187, filed as application No. PCT/KR2019/017356 on Dec. 10, 2019, now abandoned.

(30) Foreign Application Priority Data

Apr. 17, 2019 (KR) .................. 10-2019-0044991

(51) Int. Cl.
H01M 10/48 (2006.01)
H01M 50/105 (2021.01)
H01M 50/574 (2021.01)
H01M 50/581 (2021.01)

(52) U.S. Cl.
CPC ......... *H01M 10/486* (2013.01); *H01M 10/48* (2013.01); *H01M 50/105* (2021.01); *H01M 50/574* (2021.01); *H01M 50/581* (2021.01); *H01M 2200/105* (2013.01); *H01M 2200/106* (2013.01)

(58) Field of Classification Search
CPC .. H01M 10/486; H01M 10/48; H01M 50/105; H01M 50/574; H01M 50/581; H01M 2200/105; H01M 2200/106
See application file for complete search history.

(56) References Cited

U.S. PATENT DOCUMENTS

| 9,874,610 | B2 | 1/2018 | Ding |
| 2002/0004160 | A1 | 1/2002 | Shimada et al. |
| 2010/0015522 | A1 | 1/2010 | Hasunuma et al. |
| 2011/0039134 | A1 | 2/2011 | Kim et al. |
| 2011/0210703 | A1 | 9/2011 | Souza et al. |

(Continued)

FOREIGN PATENT DOCUMENTS

| CN | 1325148 A | 12/2001 |
| CN | 102496750 A | 6/2012 |

(Continued)

OTHER PUBLICATIONS

International Search Report for Application No. PCT/KR2019/017356, dated Mar. 16, 2020, 2 pages.

(Continued)

*Primary Examiner* — Matthew T Martin
*Assistant Examiner* — Grace Ann Kenlaw
(74) *Attorney, Agent, or Firm* — Lerner David LLP

(57) ABSTRACT

A secondary battery includes: an electrode assembly; a sheet-type exterior configured to accommodate the electrode assembly; and a plurality of temperature sensing parts provided adjacent to the exterior to sense a temperature of a plurality of areas, respectively, of the exterior, wherein at least one of the plurality of temperature sensing parts includes: a positive temperature coefficient (PTC) element; and a negative temperature coefficient (NTC) element.

6 Claims, 10 Drawing Sheets

(56) References Cited

U.S. PATENT DOCUMENTS

| | | |
|---|---|---|
| 2012/0106015 A1 | 5/2012 | Kwak et al. |
| 2014/0004393 A1 | 1/2014 | Takahashi et al. |
| 2014/0312911 A1 | 10/2014 | Ding |
| 2015/0255839 A1 | 9/2015 | Takahashi et al. |
| 2015/0303414 A1 | 10/2015 | Park et al. |
| 2016/0079638 A1 | 3/2016 | Chu et al. |
| 2017/0077569 A1 | 3/2017 | Takahashi et al. |
| 2017/0170533 A1 | 6/2017 | Choi et al. |
| 2018/0277912 A1 | 9/2018 | Takahashi et al. |

FOREIGN PATENT DOCUMENTS

| | | | |
|---|---|---|---|
| CN | 106207980 | A | 12/2016 |
| JP | H05074481 | A | 3/1993 |
| JP | 2001025158 | A | 1/2001 |
| JP | 2001025159 | | 1/2001 |
| JP | 2002056900 | A | 2/2002 |
| JP | 2003308887 | A | 10/2003 |
| JP | 2007123287 | A | 5/2007 |
| JP | 2010244844 | A | 10/2010 |
| JP | 2013077433 | A | 4/2013 |
| JP | 5914694 | B2 | 5/2016 |
| KR | 20010107690 | A | 12/2001 |
| KR | 20080024131 | A | 3/2008 |
| KR | 100964175 | B1 | 6/2010 |
| KR | 20110016821 | A | 2/2011 |
| KR | 20120061004 | A | 6/2012 |
| KR | 20130089376 | A | 8/2013 |
| KR | 20140062575 | A | 5/2014 |
| KR | 20140116599 | A | 10/2014 |
| KR | 20150131759 | A | 11/2015 |
| KR | 20160061721 | A | 6/2016 |
| KR | 20160144224 | A | 12/2016 |
| KR | 101734717 | B1 | 5/2017 |
| KR | 101849763 | B1 | 4/2018 |
| KR | 20180067493 | A | 6/2018 |
| WO | 2006115342 | A1 | 11/2006 |

OTHER PUBLICATIONS

Extended European Search Report and European Search Opinion for European Application No. 19924672.9 dated Apr. 8, 2022, 7 pgs.
Search Report dated Nov. 23, 2022 from the Office Action for Chinese Application No. 201980094919.2 issued Nov. 29, 2022, pp. 1-3. [See p. 1, categorizing the cited references].

SECONDARY BATTERY AND BATTERY MODULE HAVING THE SAME

CROSS-REFERENCE TO RELATED APPLICATION

The present application is a continuation of U.S. patent application Ser. No. 17/601,187, filed on Oct. 4, 2021, which is a national phase entry under 35 U.S.C. § 371 of International Application No. PCT/KR2019/017356, filed Dec. 10, 2019, published in Korean, which claims the benefit of the priority of Korean Patent Application No. 10-2019-0044991, filed on Apr. 17, 2019, which are hereby incorporated by reference in their entireties.

TECHNICAL FIELD

The present invention relates to a secondary battery and a battery module including the secondary battery, and more particularly, to a secondary battery having a structure which is capable of interrupting current when a temperature of the secondary battery exceeds a predetermined value, and a battery module including the secondary battery.

BACKGROUND ART

Secondary batteries capable of being repeatedly chargeable and dischargeable need to be secured so that ignition or explosion does not occur when abnormal operation occurs.

For example, when a temperature within a secondary battery exceeds a predetermined value due to short circuit or the like of the secondary battery, it is necessary to interrupt current from flowing through the secondary battery.

The secondary battery may be classified into a cylindrical type secondary battery, a prismatic type battery secondary battery, a pouch type secondary battery, and the like according to its structure or manufacturing method.

Among them, the pouch type secondary battery has a structure in which an electrode assembly having a structure in which electrodes and separators are alternately disposed in a sheet-shaped pouch exterior is accommodated.

In particular, the pouch type secondary battery has been widely used due to its relatively simple process and low manufacturing cost.

However, according to the related art, there is a problem in securing safety because the pouch type secondary battery is not provided with a constitute that is capable of interrupting current when a temperature within the secondary battery abnormally increases.

DISCLOSURE OF THE INVENTION

Technical Problem

Therefore, an object of the present invention for solving the above problem is to provide a pouch type secondary battery in which current is interrupted when a temperature within the secondary battery abnormally increases, thereby improving safety.

Technical Solution

According to one aspect of the present invention for achieving the above object, a secondary battery includes: an electrode assembly; a sheet-type exterior configured to accommodate the electrode assembly; and a plurality of temperature sensing parts provided adjacent to the exterior to sense a temperature of a plurality of areas, respectively, of the exterior, wherein at least one of the plurality of temperature sensing parts includes: a positive temperature coefficient (PTC) element; and a negative temperature coefficient (NTC) element.

The secondary battery may further include an electrode lead having a shape that protrudes outward, wherein one of the at least one of the plurality of temperature sensing parts provided with the NTC element may be adjacent to the electrode lead.

The secondary battery may further include a positive electrode lead and a negative electrode lead each having a shape that protrudes outward, and wherein one of the at least one of the plurality of temperature sensing parts provided with the NTC element may be adjacent to the negative electrode lead.

The plurality of temperature sensing parts may be attached to a top surface or a bottom surface that is a main plane of the exterior.

The plurality of temperature sensing parts may be attached to a side surface of the exterior.

The exterior may include: a body part having an internal space in which the electrode assembly is accommodated; and a sealing part configured to seal the internal space of the body part from the outside, wherein the plurality of temperature sensing parts may be attached to the sealing part, and the sealing part may be bent to be in contact with a side surface of the exterior.

The secondary battery may further include an adhesive part adhering to a portion of a surface of the exterior, wherein the plurality of temperature sensing parts may be attached to the adhesive part.

The exterior may include: a body part having an internal space in which the exterior is accommodated; and a sealing part configured to seal the internal space of the body part from the outside, wherein the adhesive part may adhere together to the sealing part and the body part so that the sealing part is bent to be in contact with a side surface of the exterior.

The adhesive part may be attached to only an entire top surface or an entire bottom surface that is a main plane of the exterior.

A circuit configured to connect the plurality of temperature sensing parts to each other may connect the plurality of temperature sensing parts to each other in a zigzag shape.

According to another aspect of the present invention for achieving the above object, a battery module includes: the secondary battery; and a controller configured to receive temperature information of the exterior on the plurality of areas to which the plurality of temperature sensing parts of the secondary battery are attached, wherein, when a temperature at one of the plurality of areas to which the plurality of temperature sensing parts are attached exceeds a predetermined value, the controller (i) interrupts current of the secondary battery or (ii) transmits a warning signal to the outside.

The controller may receive temperature information from each of the at least one of the plurality of temperature sensing parts provided with both the PTC element and the NTC element, and when a temperature provided from an NTC element exceeds a first reference temperature, the controller may transmit the warning signal to the outside.

When a temperature provided from the NTC element exceeds a second reference temperature, and a temperature provided from the PTC element exceeds a third reference temperature, the controller may interrupt the current of the secondary battery.

The second reference temperature may be greater than the first reference temperature.

The second reference temperature may be the same as the third reference temperature.

Advantageous Effects

According to the present invention, when the temperature within the pouch type secondary battery abnormally increases, the current may be interrupted to improve the safety.

MODE FOR CARRYING OUT THE INVENTION

Hereinafter, structures of a secondary battery and a battery module according to the present invention will be described with reference to the accompanying drawings.

Secondary Battery

Figure 1:
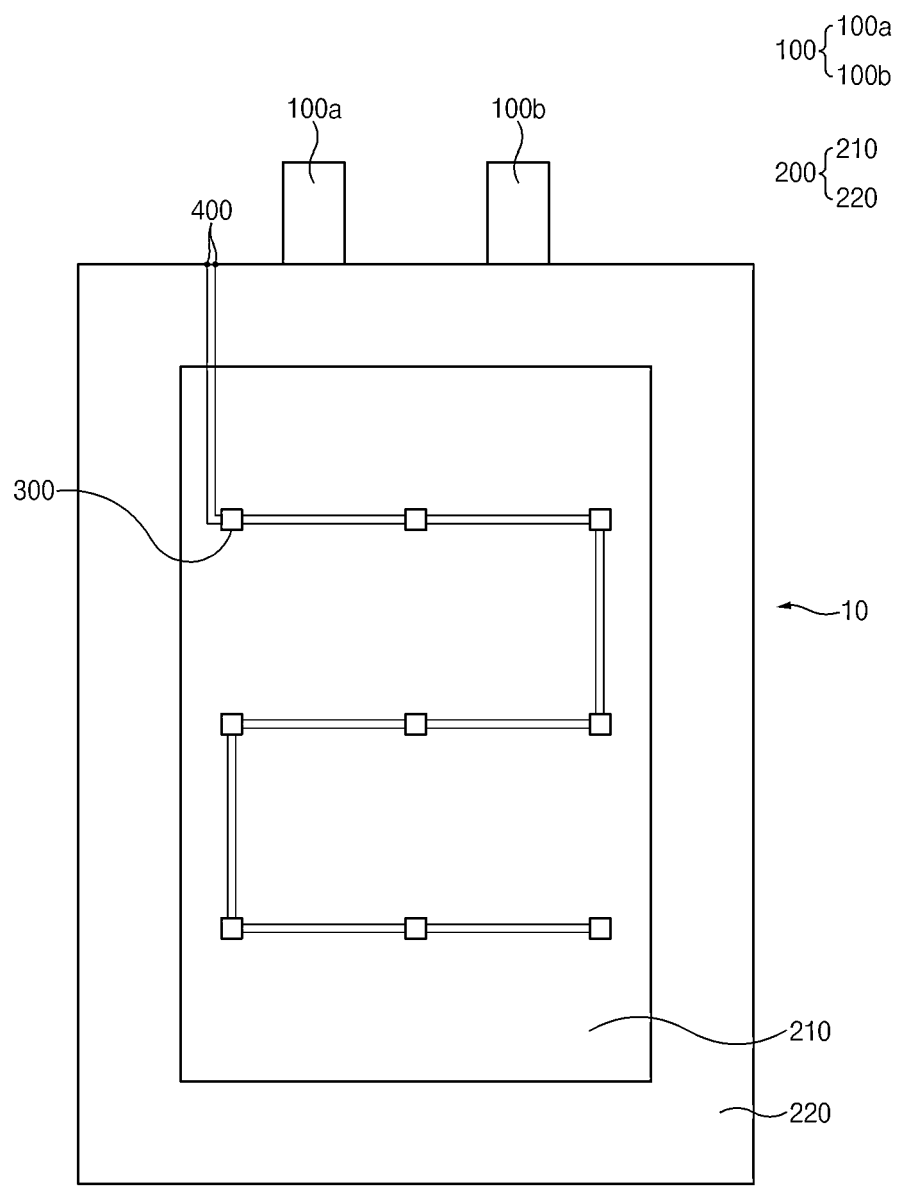
FIG. 1 is a plan view illustrating a structure of a secondary battery according to a first embodiment of the present invention.
Figure 2:
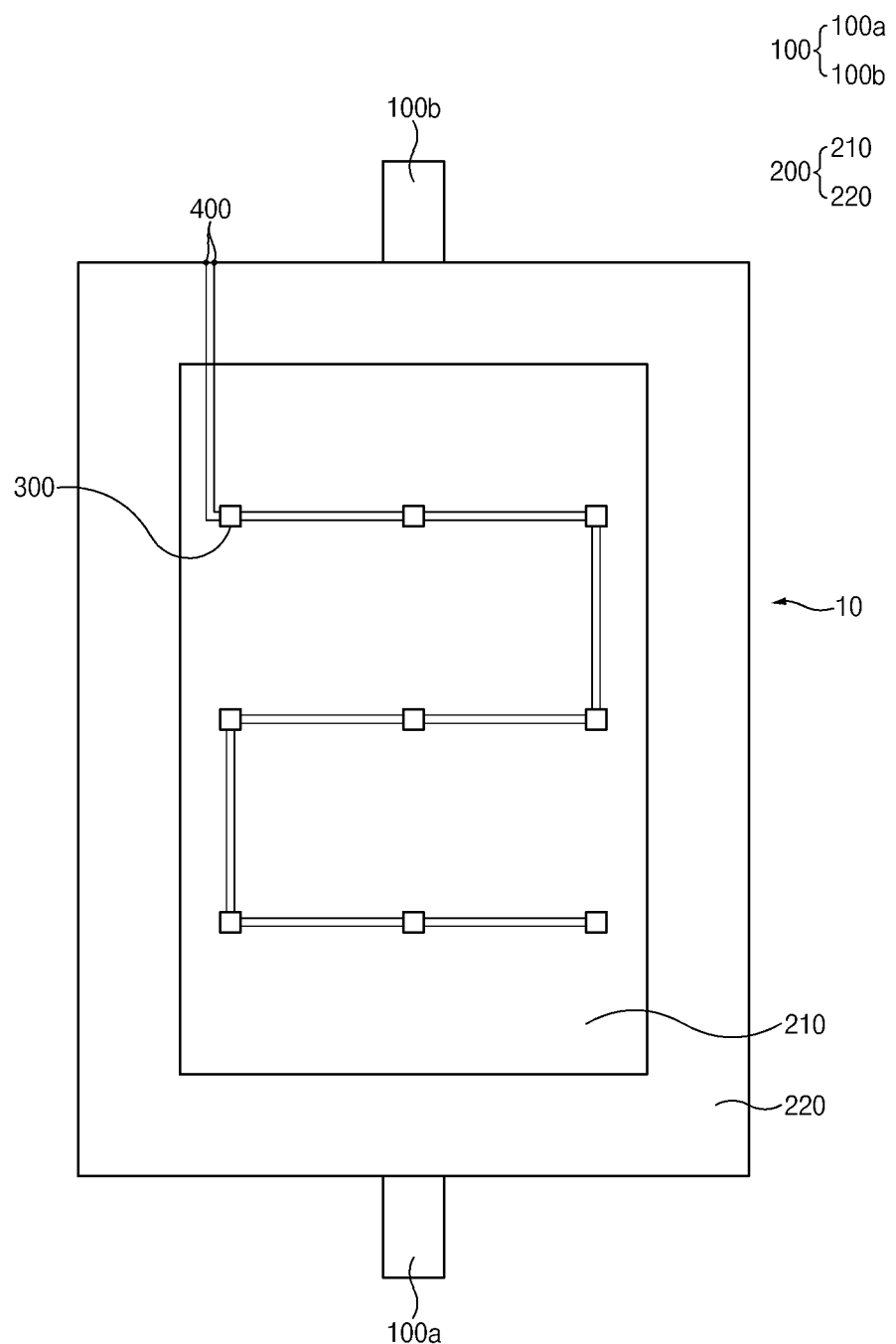
FIG. 2 is a plan view illustrating a structure of a secondary battery according to a second embodiment of the present invention.

FIG. 1 is a plan view illustrating a structure of a secondary battery according to a first embodiment of the present invention, and FIG. 2 is a plan view illustrating a structure of a secondary battery according to a second embodiment of the present invention.

Figure 3:
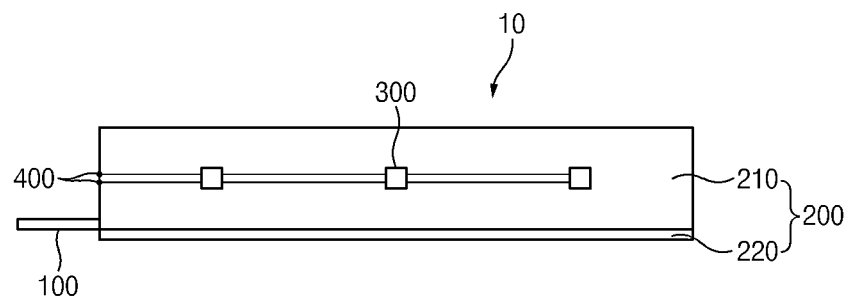
FIG. 3 is a side view illustrating a structure of a secondary battery according to a third embodiment of the present invention.

Also, FIG. 3 is a side view illustrating a structure of a secondary battery according to a third embodiment of the present invention.

A secondary battery 10 according to the present invention may include an electrode assembly and a sheet type exterior 200 (hereinafter, referred to as an 'exterior') that accommodates the electrode assembly.

The electrode assembly may have a structure in which electrodes and separators are alternately arranged.

As illustrated in FIGS. 1 and 2, the exterior 200 may include a body part 210, in which an internal space in which the electrode assembly is accommodated is defined, and a sealing part 220 that seals the internal space of the body part 210 from the outside.

The sealing part 220 may have a structure in which two sheets are bonded to each other.

In this specification, a surface having the largest area among surfaces of the body part 210 of the exterior 200 is referred to as a 'main plane', and a surface formed around the main plane is referred to as a 'side surface'.

Referring to FIGS. 1 to 3, an area, which is illustrated in FIGS. 1 and 2, of the body part 210 of the exterior is the main plane of the exterior 200, and an area, which is illustrated in FIG. 3, of the body part 210 of the exterior is the side surface of the exterior 200.

The main plane of the exterior 200 may be understood as a top or bottom surface of the exterior 200.

Also, the secondary battery 10 according to the present invention may include an electrode lead 100 having a shape protruding to the outside.

The electrode lead 100 may include a positive electrode lead 100a and a negative electrode lead 100b.

As illustrated in FIG. 1, according to the first embodiment of the present invention, the positive electrode lead 100a and the negative electrode lead 100b may be provided at one side of the exterior 200 to protrude in the same direction.

However, as illustrated in FIG. 2, according to the second embodiment of the present invention, the positive electrode lead 100a and the negative electrode lead 100b may be respectively provided at one side of the exterior 200 and the other side opposite to the one side to protrude in opposite directions.

The secondary battery 10 according to the present invention may include a plurality of temperature sensing parts 300 provided adjacent to the exterior 200.

The temperature sensing part 300 according to the present invention may be configured to sense a temperature in one region of the exterior 200.

As described below, information about a temperature in a plurality of areas of the exterior 200 sensed by the temperature sensing parts 300, respectively, may be provided to a controller 20 (see FIG. 10).

In FIGS. 1 and 2, the temperature sensing parts 300 are provided in the form of 3×3 matrix on the main plane of the exterior. Here, a circuit that connects the temperature sensing parts 300 to each other has a shape in which the temperature sensing parts 300 are connected to each other in a zigzag shape.

FIG. 3 illustrates a state in which three temperature sensing parts 300 are provided side by side on the exterior 200.

The plurality of temperature sensing parts 300 may be directly attached to one surface of the exterior 200.

Here, as illustrated in FIGS. 1 and 2, the temperature sensing parts 300 may be attached to the top or bottom, which is the main plane of the exterior 200, and as illustrated in FIG. 3, the temperature sensing parts 300 may be attached to the side surface of the exterior 200.

As illustrated in FIGS. 1 to 3, the secondary battery 10 according to the present invention may further include a terminal part 400 provided on the surface of the exterior 200 and connected to any one of the plurality of temperature sensing parts 300 by the circuit.

FIGS. 1 to 3 illustrate a case in which the terminal part 400 is provided at one side of the exterior 200 on which the electrode lead 100 is disposed.

According to the present invention, each of the plurality of temperature sensing parts 300 provided in the secondary battery 10 may include a positive temperature coefficient (PTC) element.

Also, at least one of the plurality of temperature sensing parts 300 may include a negative temperature coefficient (NTC) element.

At least one of the plurality of temperature sensing parts 300 may include the PTC element and the NTC element.

The PTC element represents an element in which electrical resistance increases rapidly when the temperature increases, and the NTC element represents an element in which electrical resistance increases when the temperature decreases.

According to the present invention, since at least one of the plurality of temperature sensing parts includes both the PTC element and the NTC element, more reliable information with respect to the temperature in a specific region of the exterior may be obtained.

That is, when only one type of temperature measurement element is provided in the temperature sensing parts, the temperature information in the specific region of the exterior is limited to information obtained from only one type of temperature measurement element.

Thus, even if the temperature information obtained from one type of temperature measurement element is wrong, it is not known that the information is wrong, thereby deteriorating the reliability of the temperature information in the specific region of the exterior.

However, according to the present invention, since at least one temperature sensing part includes two types of temperature measurement elements, the temperature information in the specific region of the exterior may also be obtained through the two channels.

If the temperature information obtained from one type of temperature measurement element is wrong, the error of the temperature information may be revealed through cross-checking using the temperature information obtained from the different type of temperature measurement elements.

Thus, according to the present invention, the reliability of information on the temperature in the specific region of the exterior may be improved.

It is considered that each of the plurality of temperature sensing parts includes the PTC element, and at least one of the plurality of temperature sensing parts includes the NTC element. However, in general, in the case of the NTC element, since the NTC element is more expensive than the PTC element, it may not be desirable in terms of economics when the temperature sensing parts are configured in the above-described structure.

In view of the safety of the temperature of the secondary battery, it may be preferable that the temperature sensing part provided with two kinds of temperature measurement elements among the plurality of temperature sensing parts is provided at a position at which the temperature is high in the secondary battery.

This is because there is also high possibility of abnormal temperature increase at the position at which an amount of heat is large.

In the secondary battery, a region in which the electrode assembly and the electrode lead are connected to each other generally has a relatively high temperature.

In order to connect the electrode assembly to the electrode lead, a welding process is performed because large heat generation occurs on the welded area, and current flowing through the electrode assembly having a relatively large width is concentrated in the electrode lead having a relatively narrow width.

Thus, the NTC element may be provided in the temperature sensing part adjacent to the electrode lead among the plurality of temperature sensing parts 300.

Referring to FIGS. 1 and 2, the NTC element may be provided in at least one of the upper temperature sensing part 300 that is closest to the electrode lead 100 among the plurality of temperature sensing parts 300.

In general, since thermal conductivity of a material (e.g., copper) used for the negative electrode lead is greater than that of a material (e.g., aluminum) used for the positive electrode lead, it is common that large heat generation occurs in the negative electrode lead.

Also, when the secondary battery is discharged, since charges flow from the negative electrode lead to the positive electrode lead, it is common that a relatively high temperature is generated on the area on which the negative electrode lead and the electrode assembly are electrically connected to each other.

Thus, the NTC element may be provided in the temperature sensing part adjacent to the negative electrode lead 100*b* among the plurality of temperature sensing parts 300.

Referring to FIG. 2, the NTC element may be provided in the temperature sensing part that is provided at a central portion in the upper temperature sensing parts 300, which is closest to the negative electrode lead 100*b*, among the plurality of temperature sensing parts 300.

Figure 4:
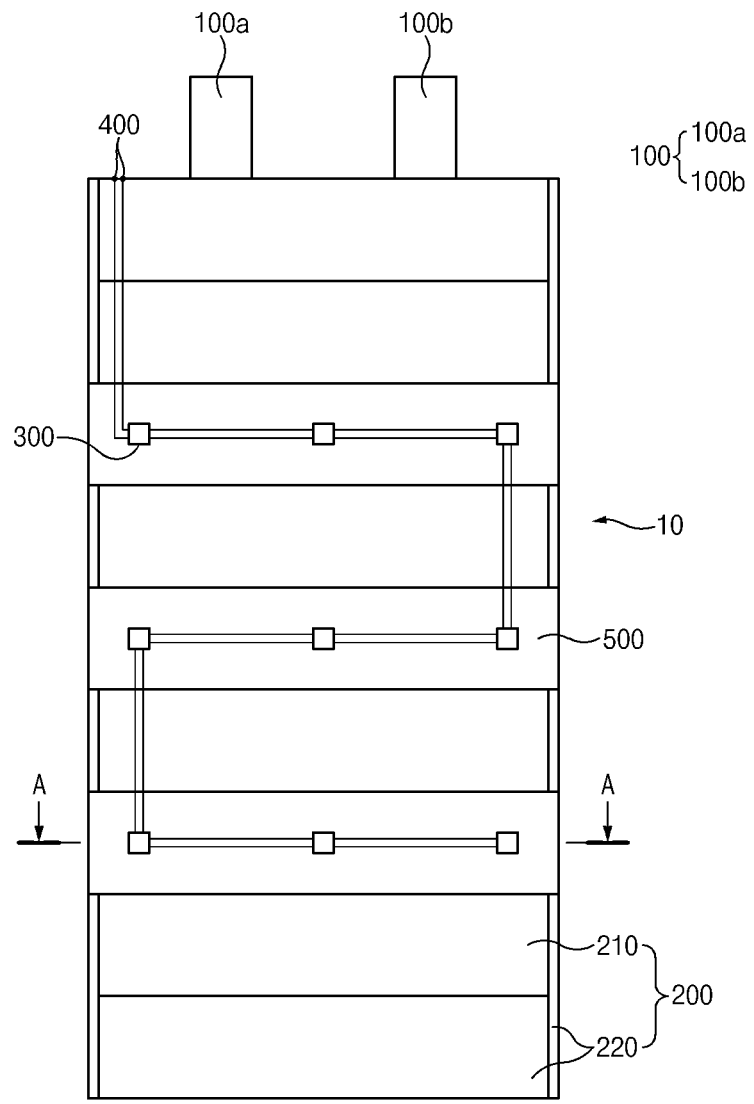
FIG. 4 is a plan view illustrating a structure of a secondary battery according to a fourth embodiment of the present invention.
Figure 5:
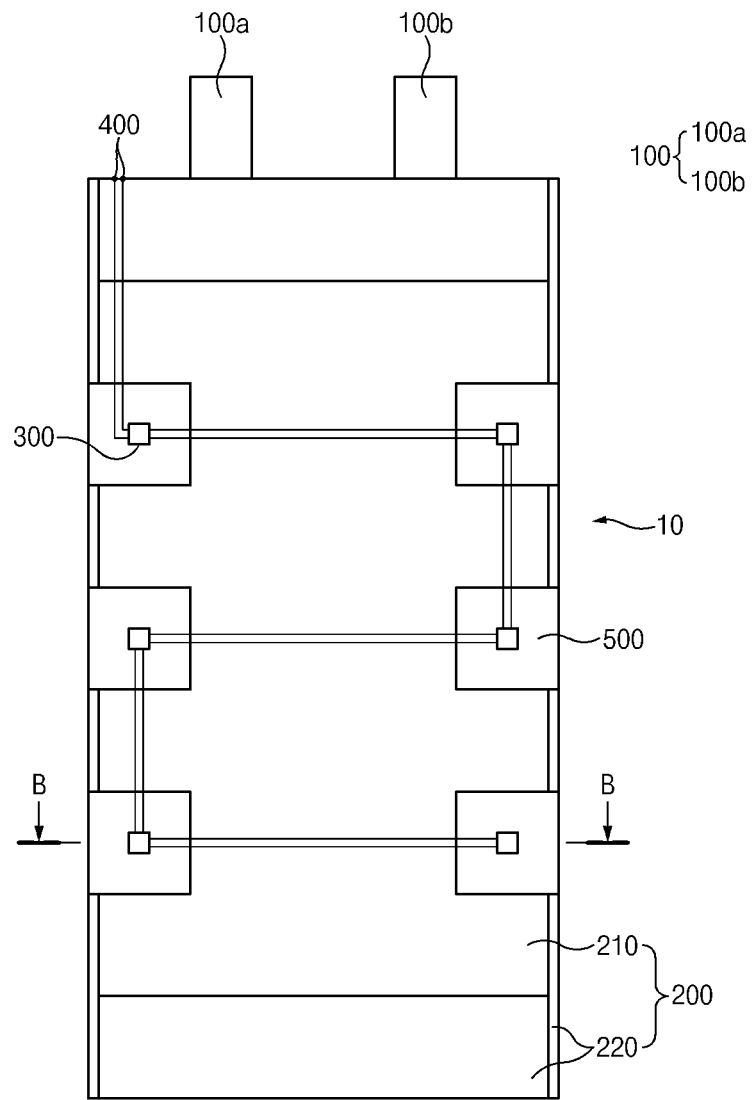
FIG. 5 is a plan view illustrating a structure of a secondary battery according to a fifth embodiment of the present invention.

FIG. 4 is a plan view illustrating a structure of a secondary battery according to a fourth embodiment of the present invention, and FIG. 5 is a plan view illustrating a structure of a secondary battery according to a fifth embodiment of the present invention.

Figure 6:
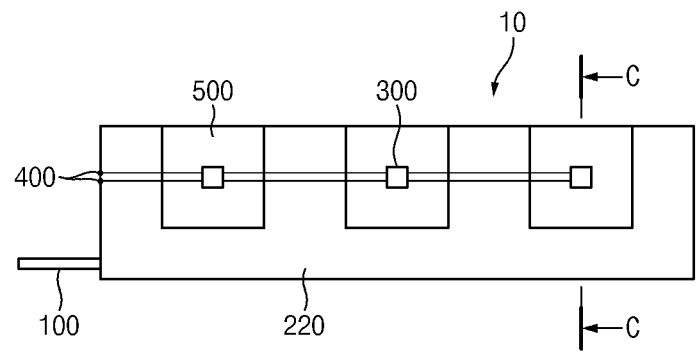
FIG. 6 is a side view illustrating a structure of a secondary battery according to a sixth embodiment of the present invention.
Figure 7:
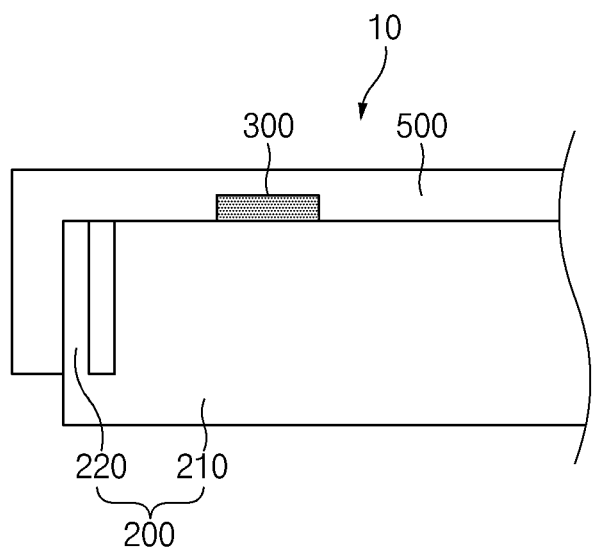
FIG. 7 is a side cross-sectional view illustrating the structure of the secondary battery, taken along line A-A of FIG. 4.
Figure 8:
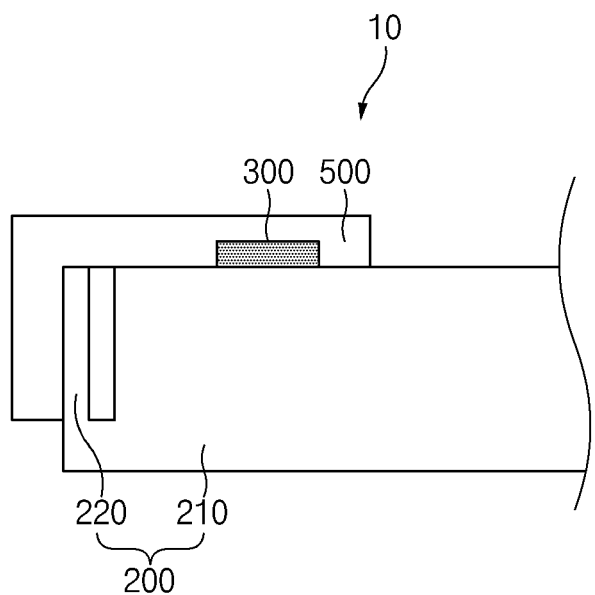
FIG. 8 is a side cross-sectional view illustrating the structure of the secondary battery, taken along line B-B of FIG. 5.

Also, FIG. 6 is a side view illustrating a structure of a secondary battery according to a sixth embodiment of the present invention.

As illustrated in FIGS. 4 to 6, the secondary battery 10 according to the fourth to sixth embodiments of the present invention may further include an adhesive part 500 adhering to a portion of the surface of the exterior 200, and the plurality of temperature sensing parts 300 may be attached to attached to the adhesive part 500.

According to the fourth and fifth embodiments of the present invention, since the adhesive part 500, to which the plurality of temperature sensing parts 300 attached, adheres to the surface of the exterior, the plurality of temperature sensing parts 300 may be in close contact with the surface of the exterior 200 by the adhesive part 500.

Here, the adhesive part 500 may be provided in the secondary battery 10 in various manners.

As illustrated in FIGS. 4, 5, 7, and 8, the adhesive part 500 may adhere together to the sealing part 220 and the body part 210 so that the sealing part 220 is bent to be in close contact with the side surface of the exterior 200.

Here, as illustrated in FIG. 4, according to the fourth embodiment of the present invention, the adhesive part 500 may extend in a width direction of the main plane of the exterior 200 to adhere together to a surface of the body part 210 and each of surfaces of the two sealing parts 220, which are respectively disposed on both sides of the body part 210.

Alternatively, as illustrated in FIG. 5, according to the fifth embodiment of the present invention, the adhesive part 500 may adhere together to the main plane and the body part 210 and a surface of one sealing part 220 disposed at one side of the exterior 200.

In FIG. 4, three adhesive parts 500 are provided. Here, three temperature sensing parts 300 are respectively provided on areas of the respective adhesive parts 500, which adhere to the main plane of the exterior 200. In FIG. 5, six adhesive parts 500 are provided. Here, one temperature sensing part 300 is provided on each of areas of the respective adhesive parts 500, which adhere to the main plane of the exterior 200.

However, in contrast, the temperature sensing part 300 may be provided on an area of the adhesive part 500, which adheres to the side surface of the exterior 200.

Figure 9:
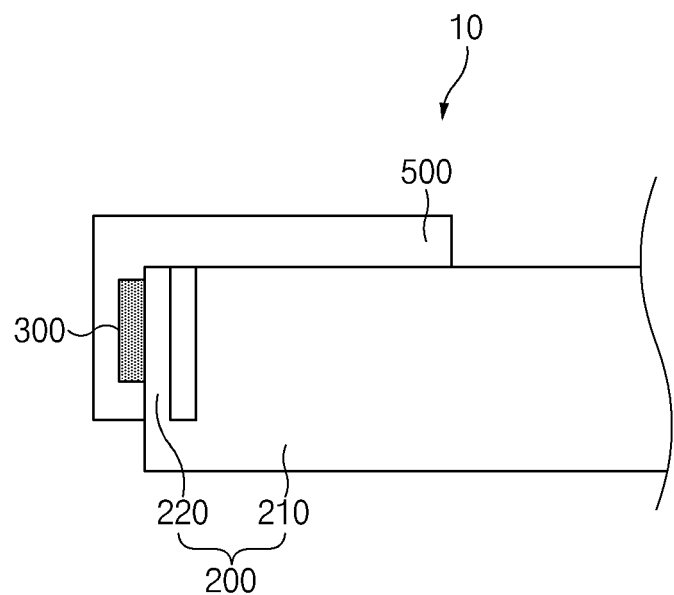
FIG. 9 is a side cross-sectional view illustrating the structure of the secondary battery, taken along line C-C of FIG. 6.

That is, as illustrated in FIGS. 6 and 9, according to the sixth embodiment of the present invention, the adhesive part 500 may adhere together to the sealing part 220 and the body part 210 so that the sealing part 220 is bent to be in close contact with the side surface of the exterior 200. Here, one temperature sensing part 300 may be provided on each of areas of the respective adhesive parts 500, which adhere to the surface of the sealing part 220.

Thus, according to the sixth embodiment of the present invention, the sealing part 200 may be bent by the adhesive part 500 to be in close contact with the side surface of the exterior 200, and since the plurality of temperature sensing parts 300 attached to each adhesive part 500 are attached to the sealing part 220, the temperature sensing parts 300 may be provided adjacent to the side surface of the exterior 200.

Alternatively, in contrast, the adhesive part to which the plurality of temperature sensing parts are attached may be attached only to the entire top or bottom surface, which is the main plane of the exterior.

In this case, the structure of the secondary battery provided with the plurality of temperature sensing parts may be substantially the same as that of each of FIGS. 1 and 2.

Battery Module

Figure 10:
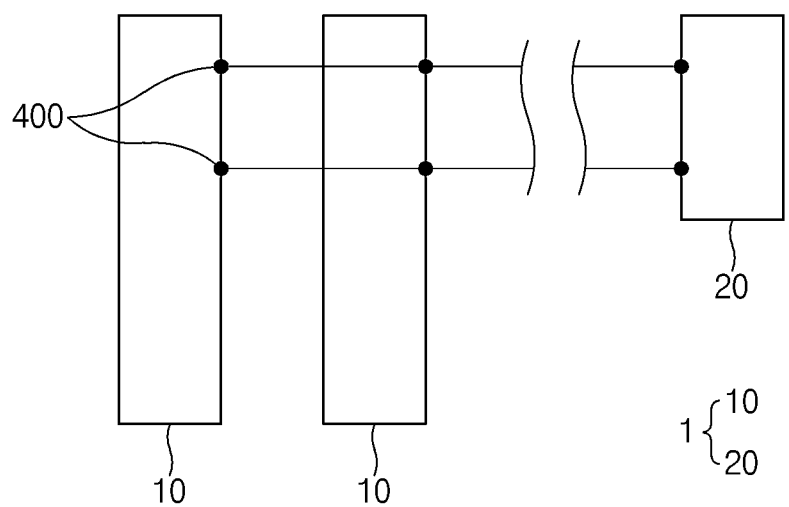
FIG. 10 is a plan view illustrating a structure of a battery module according to the present invention.

FIG. 10 is a plan view illustrating a structure of a battery module according to the present invention.

As illustrated in FIG. 10, a battery module 1 according to the present invention may include a plurality of secondary batteries 10.

Description with respect to the structure of the secondary battery 10 will be replaced with the above description.

Also, the battery module 1 according to the present invention includes a controller 20 that receives information on a temperature of the exterior from the plurality of areas to which the temperature sensing parts 300, respectively, (see FIGS. 1 to 9) of the secondary battery 10 are attached.

According to the present invention, the temperature sensing parts mounted on the plurality of secondary batteries 10 sense the temperature of the exterior on the area to which the temperature sensing parts are attached to transmit the sensed temperature information to the controller 20.

Thereafter, when a temperature on a portion of the areas to which the temperature sensing parts attached to the plurality of secondary batteries 10 are attached exceeds a predetermined value, the controller 20 may (i) interrupt current of the secondary batteries to which the temperature sensing parts, which transmit information on the temperature that exceeds the predetermined value, are attached or may (ii) transmit a warning signal to the outside.

A control method of the controller in the battery module according to the present invention will be described in more detail as follows.

The controller 20 of the battery module 1 receives information on a temperature from each of the PTC element and the NTC element, which are provided in the temperature sensing part of the secondary battery 10.

According to the present invention, the controller may determine whether the temperature provided from the NTC element (i) is equal to or less than a first reference temperature, (ii) is equal to or less than a second reference temperature that exceeds the first reference temperature and is greater than the first reference temperature, or (iii) exceeds the second reference temperature.

Also, according to the present invention, the controller determines whether the temperature provided from the PTC element (i) is equal to or less than a third reference temperature or (ii) exceeds the third reference temperature.

Here, when it is determined that the temperature provided from the NTC element exceeds the first reference temperature, the controller transmits a first warning signal to the outside.

Thereafter, when it is determined that the temperature provided from the NTC element exceeds the second reference temperature, the controller operates as follows according to the temperature provided from the PTC element of the temperature sensing part provided with the NTC element.

When the temperature provided from the NTC element exceeds the second reference temperature, and also, when the temperature provided from the PTC element exceeds the third reference temperature, the controller interrupts the current of the secondary battery provided with the temperature sensing part including the NTC element and the PTC element.

On the other hand, when the temperature provided from the NTC element exceeds the second reference temperature, and also, when the temperature provided from the PTC element is equal to or less than the third reference temperature, the controller transmits a second warning signal to the outside.

The second reference temperature and the third reference temperature may be the same as each other.

When the second reference temperature and the third reference temperature are the same as each other, since a temperature that serves as a reference for interrupting the current of the secondary battery is provided as a single temperature, stable control and simplified control of the controller may be enabled.

Here, the fact that the second reference temperature and the third reference temperature are 'the same' as each other means that the second reference temperature is not only numerically exactly the same as the third reference temperature, but also a difference between the second reference temperature and the third reference temperature is insignificant. Thus, it should be interpreted to include a case in which a person skilled in the art may determine that the two temperatures are substantially the same.

Alternatively, in contrast, the second reference temperature may be greater than the third reference temperature.

In the battery module according to the present invention, an operation of the above-described controller relates to a case in which information on the temperatures is provided from the temperature sensing part including the PTC element and the NTC element.

Thus, when the temperature information is provided from the temperature sensing part provided with only the PTC element, the controller may operate as follows.

When the temperature provided from the PTC element exceeds the third reference temperature, the controller may interrupt current of the secondary battery provided with the temperature sensing part including the PTC element.

The controller may transmit a warning signal to the outside.

When the current of the secondary battery is interrupted by the above algorithm in the battery module according to the present invention, the interruption may be performed permanently or temporarily.

The permanent interruption of the current of the secondary battery may mean that the current is still interrupted even when the temperature of the secondary battery returns to a normal temperature.

Also, when the current of the secondary battery is performed temporarily, it may mean that the current of the secondary battery flows again when the temperature of the secondary battery returns to the normal temperature.

According to the present invention, since each of the plurality of secondary batteries constituting the battery module is provided with at least one temperature sensing part provided with the PTC element and NTC element, the reliable of the control of the secondary battery may be improved based on the information on the temperature provided from the PTC element and the NTC element.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A secondary battery comprising:
an electrode assembly;
a sheet-type exterior configured to accommodate the electrode assembly;
a plurality of temperature sensing parts provided adjacent to the exterior to sense a temperature of a plurality of areas, respectively, of the exterior;
an adhesive part adhering to a portion of a surface of the exterior;
a positive electrode lead having a shape that protrudes outward; and
a negative electrode lead having a shape that protrudes outward,
wherein the exterior comprises:
a body part having an internal space in which the electrode assembly is accommodated; and
a sealing part configured to seal the internal space of the body part,
wherein the adhesive part adheres to the sealing part and the body part so that the sealing part is bent to be in contact with a side surface of the exterior,
wherein the plurality of temperature sensing parts includes a first temperature sensing part and a plurality of second temperature sensing parts,
wherein the plurality of temperature sensing parts is attached to the adhesive part, so that the plurality of temperature sensing parts is adjacent to the side surfaces of the exterior,
wherein the first temperature sensing part comprises a positive temperature coefficient (PTC) element and a negative temperature coefficient (NTC) element, and
wherein each of the plurality of second temperature sensing parts include a respective positive temperature coefficient (PTC) element without including any negative temperature coefficient (NTC) element,
wherein the first temperature sensing part is closest to the negative electrode lead among the first temperature sensing part and the plurality of second temperature sensing parts.

2. A battery module comprising:
the secondary battery of claim 1; and
a controller configured to receive temperature information of the exterior on the plurality of areas to which the plurality of temperature sensing parts of the secondary battery are attached,
wherein, when a temperature at one of the plurality of areas to which the plurality of temperature sensing parts are attached exceeds a predetermined value, the controller (i) interrupts current of the secondary battery or (ii) transmits a warning signal.

3. The battery module of claim 2, wherein the controller receives temperature information from the first temperature sensing part, and
when a temperature provided from the NTC element exceeds a first reference temperature, the controller transmits the warning signal.

4. The battery module of claim 3, wherein, when a temperature provided from the NTC element exceeds a second reference temperature, and a temperature provided from the PTC element exceeds a third reference temperature, the controller interrupts the current of the secondary battery.

5. The battery module of claim 4, wherein the second reference temperature is greater than the first reference temperature.

6. The battery module of claim 4, wherein the second reference temperature is the same as the third reference temperature.

* * * * *